Sept. 13, 1960     R. W. DODGE     2,952,084
MATERIALS HANDLING MACHINE
Filed Jan. 31, 1957                9 Sheets-Sheet 1
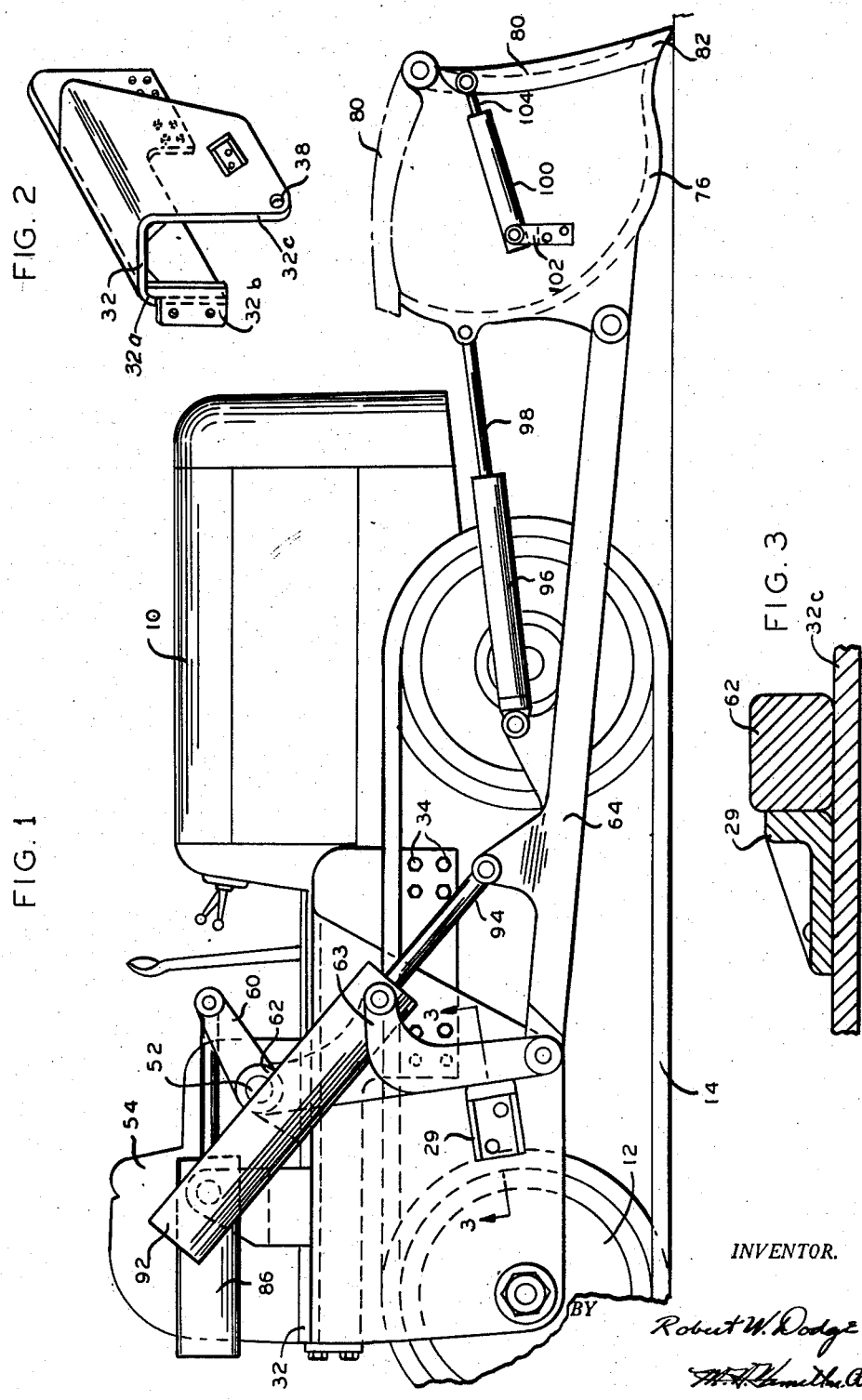
INVENTOR.
Robert W. Dodge

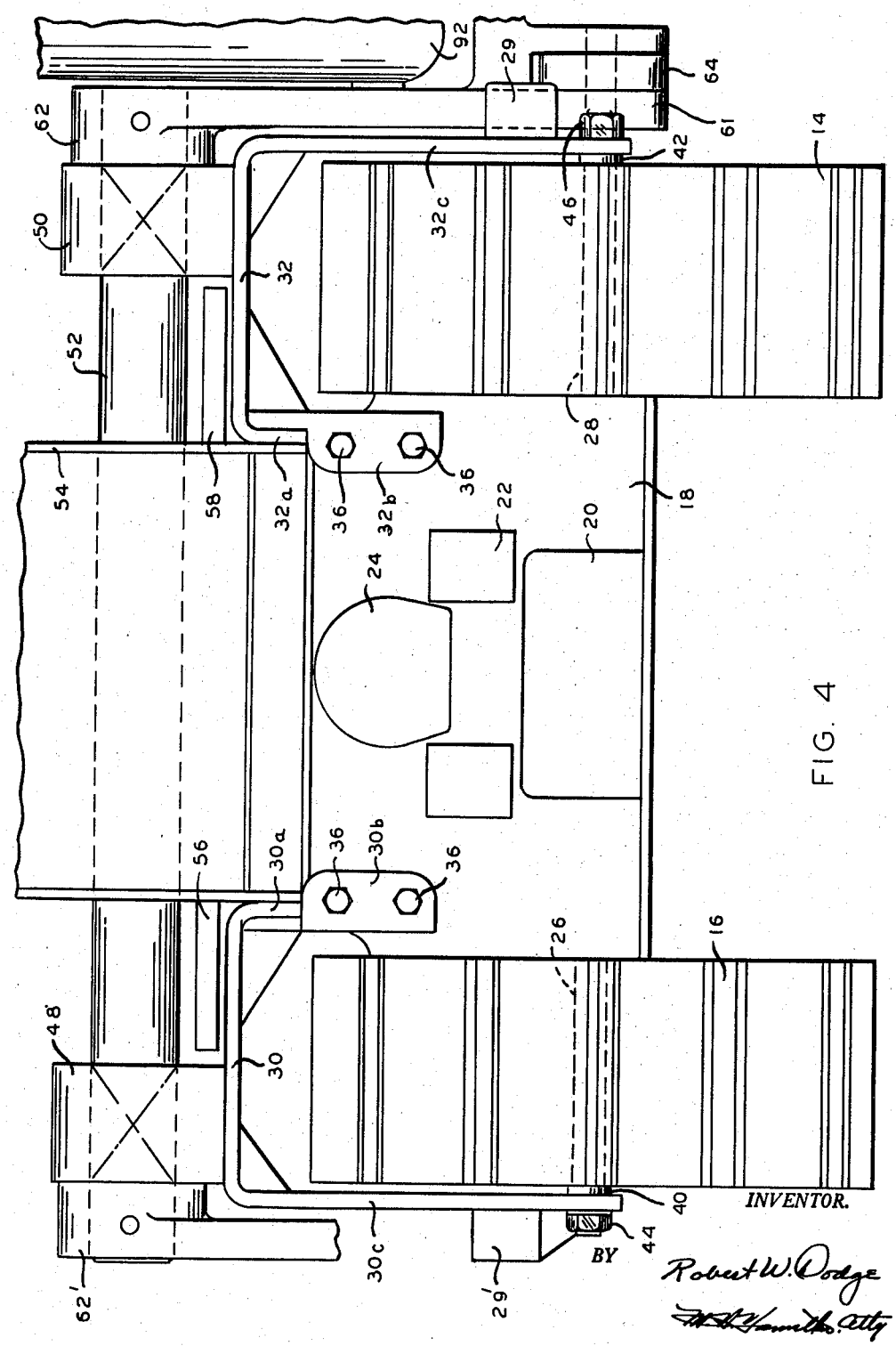

Sept. 13, 1960 R. W. DODGE 2,952,084
MATERIALS HANDLING MACHINE
Filed Jan. 31, 1957 9 Sheets-Sheet 3

INVENTOR.
Robert W. Dodge
BY

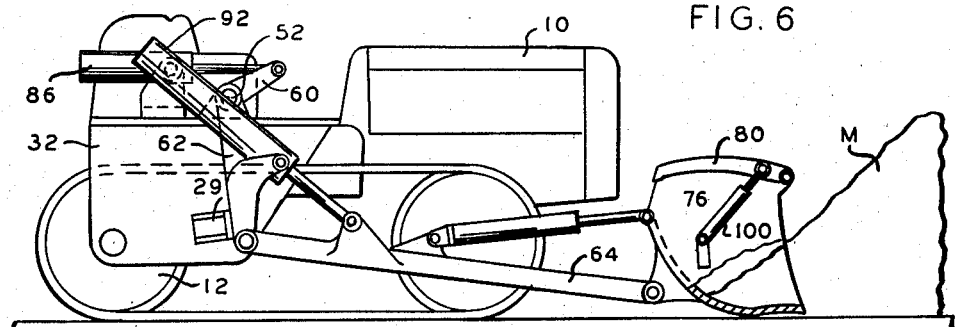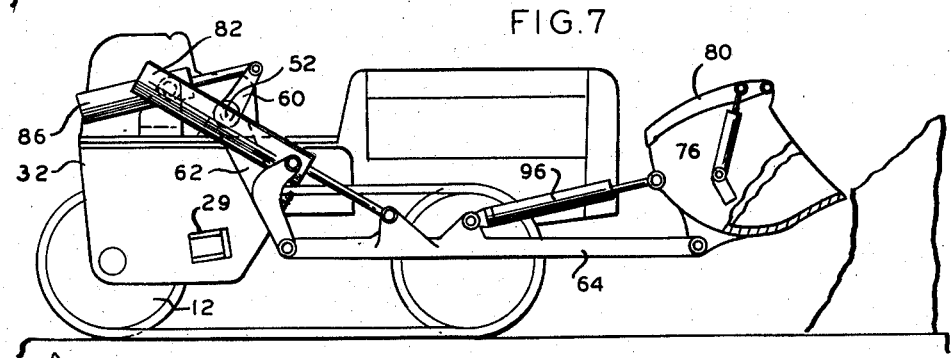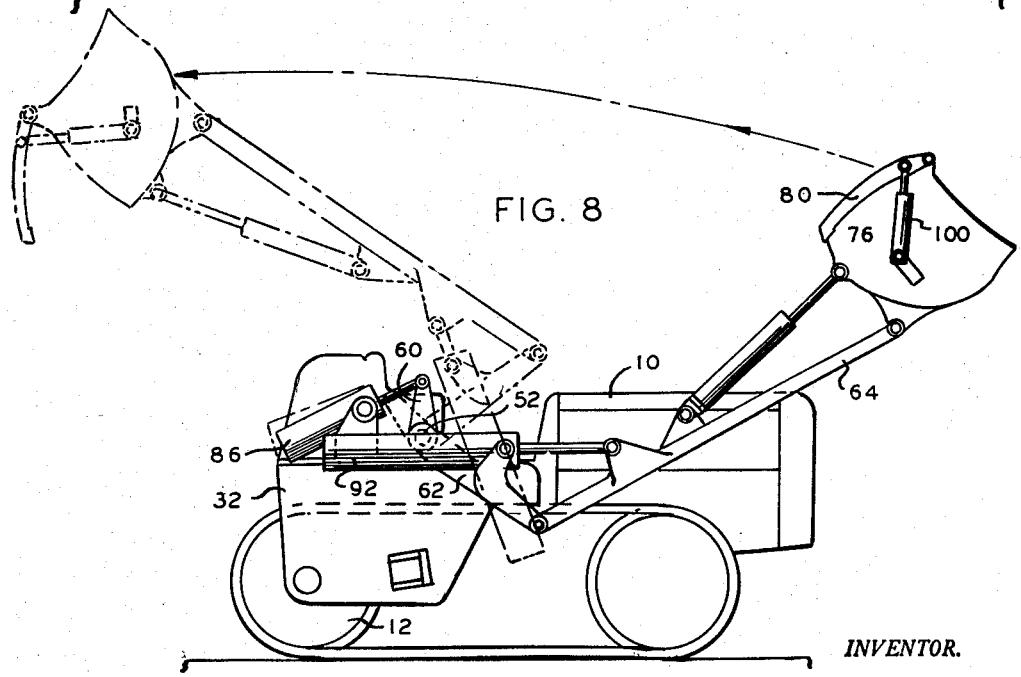

INVENTOR.
Robert W. Dodge

Sept. 13, 1960 R. W. DODGE 2,952,084
MATERIALS HANDLING MACHINE
Filed Jan. 31, 1957 9 Sheets-Sheet 8

INVENTOR.
Robert W. Dodge
BY
ATTORNEY

United States Patent Office 2,952,084
Patented Sept. 13, 1960

2,952,084
MATERIALS HANDLING MACHINE
Robert W. Dodge, 176 Main St., Wenham, Mass.
Filed Jan. 31, 1957, Ser. No. 637,483
7 Claims. (Cl. 37—117.5)

This invention relates to improved materials handling machines, and more particularly to machines for performing operations which are customarily carried out by means of earth moving equipment, such as bull dozers, loaders, shovels, and the like.

Included among the various classes of earth moving equipment now commonly employed are two motor driven types of machines—the so-called "bull dozer" type and the "loader" type—each of which depend upon the same general form of tractor body. On the tractor body there are supported, in various ways, special materials handling elements. In the case of the bull dozer, a heavy adjustable blade with a special cutting edge is provided and heavily reinforced and braced against shock and stresses, whereas the loader is equipped with a shovel or bucket which is usually carried on a conventional boom or lifting arm structure.

It has been found that there are many situations where it would be desirable to have available a machine capable of functioning both as a bull dozer and a loader. However, the conventional bull dozer is not provided with means for properly performing a loading operation. In the case of the conventional loaders, it is found that standard types of boom and lifting arm structures, when subjected to the stresses and shocks developed in a bull dozing operation, quickly become damaged and soon break down entirely.

It is an object of the present invention to deal with the problem indicated and to devise materials handling apparatus which can be combined with conventional tractor body structures to function either as a bull dozer or a loader without damage to or interference with standard mechanisms employed. It is also an object of the invention to provide a combined bull dozer blade and bucket assembly with which novel handling operations can be carried out and the normal range of operation of a loader is substantially extended. Still another object is to devise dual purpose structures which can readily be combined with conventional types of tractor bodies without materially altering or modifying existing parts of such vehicles in any significant manner and which is designed to be utilized either in a position inside the tractor tread or tracks or outside of the tracks as required. Still another object of the invention is to devise a combined bull dozer or loader mechanism in which the stresses developing out of loading or bull dozing operations may be more satisfactorily distributed throughout the tractor body and its rear driving wheels, and these combined operations can be conveniently carried out without loss of maneuverability, or visibility, on the part of the machine operator.

These and other objects and novel features will be more fully understood and appreciated from the following description of preferred embodiments of the invention selected for purposes of illustration and shown in the accompanying drawings, in which Figs. 1–9 illustrate one form of materials handling apparatus in which a blade and bucket assembly is mounted in an externally located position with respect to the traction members of a tractor, and Fig. 1 is in particular a side elevational view of a tractor member on which is mounted this form of materials handling apparatus of invention, Fig. 2 is a detail perspective view of one of the mounting frame pieces employed in securing the blade and bucket assembly of Fig. 1;

Fig. 3 is a cross-section taken on the line 3—3 of Fig. 1;

Fig. 4 is a rear elevational view of a tractor equipped with the materials handling apparatus of the invention further illustrating an arrangement of mounting frame pieces for supporting the blade and bucket assembly externally of a typical tractor body;

Fig. 6 is another elevational view of the tractor arrangement of the invention shown carrying out a loading operation;

Fig. 7 is a view similar to Fig. 6, but showing the pivoted lever mechanism in another lifting position;

Figure 9:
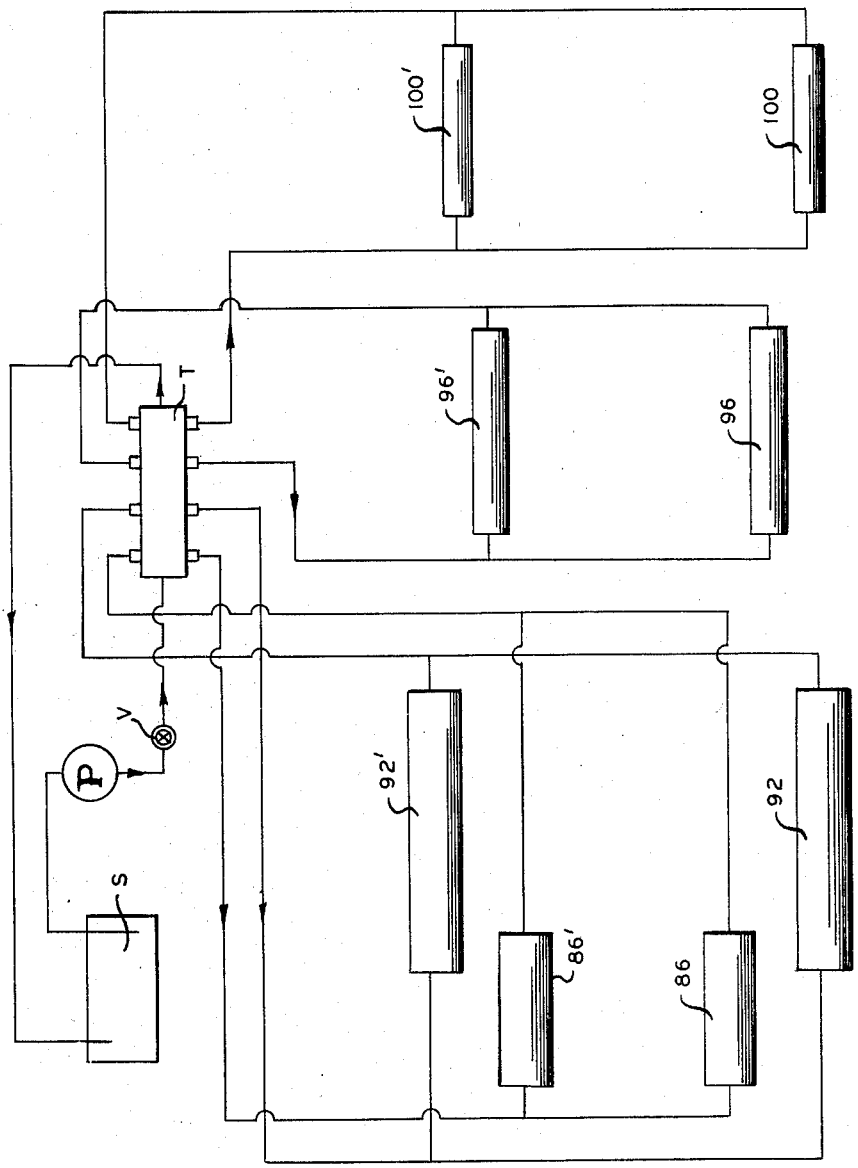

Fig. 8 is another view similar to Figs. 6 and 7, and illustrating the pivoted lever mechanism in a progressively higher loading or dumping position and also indicating in broken lines an extreme rearward position into which the lever mechanism may be moved for dumping purposes; and Fig. 9 is a diagrammatic view illustrating one form of hydraulic control apparatus for manipulating the pivoted lever mechanism.

Figure 10:
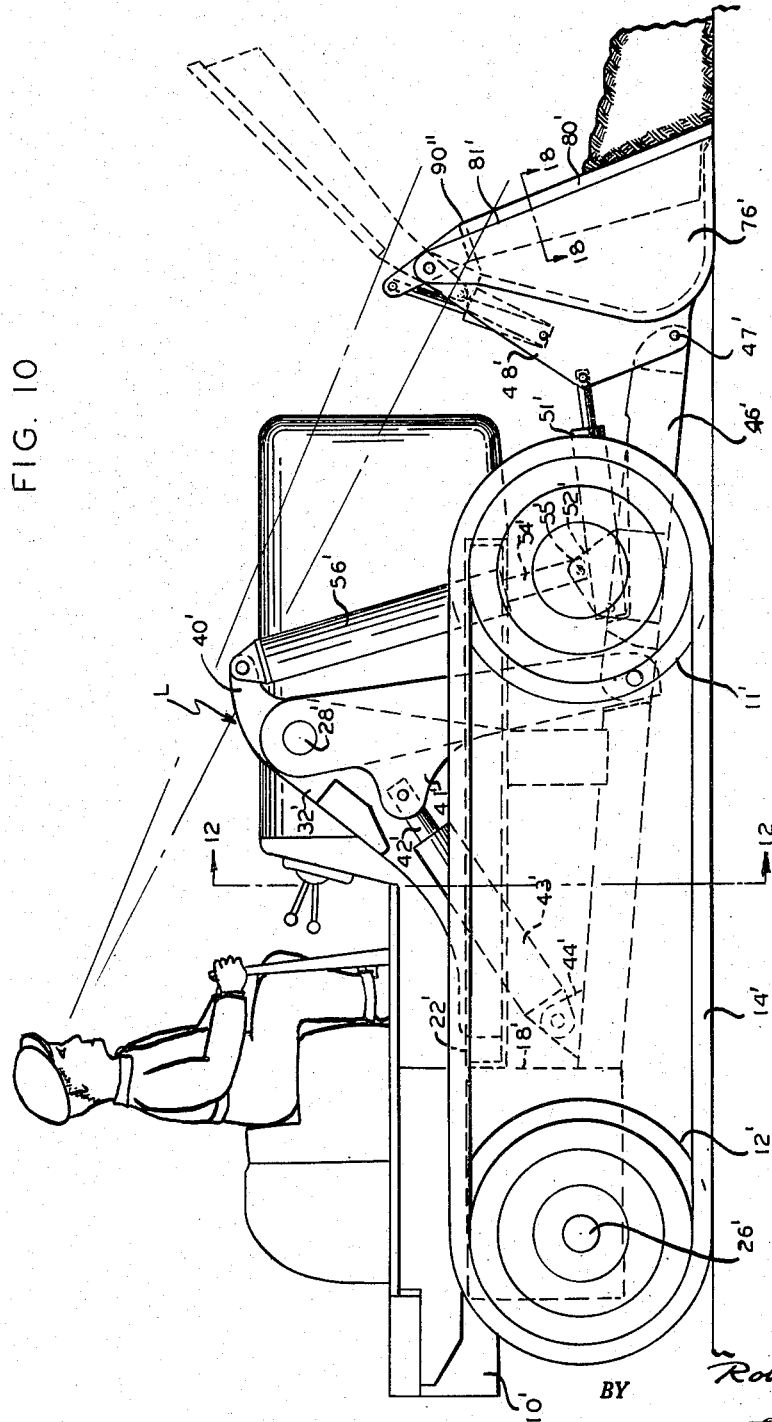
Figure 11:
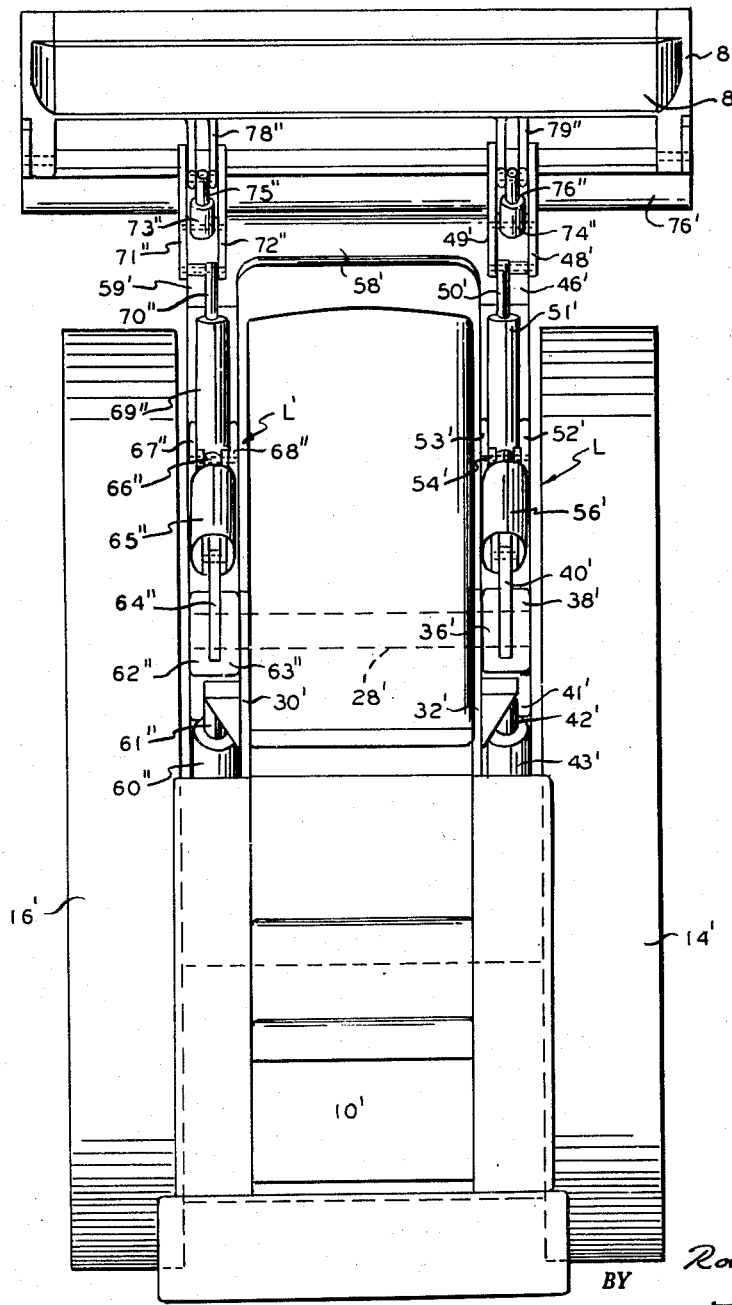
Figure 12:
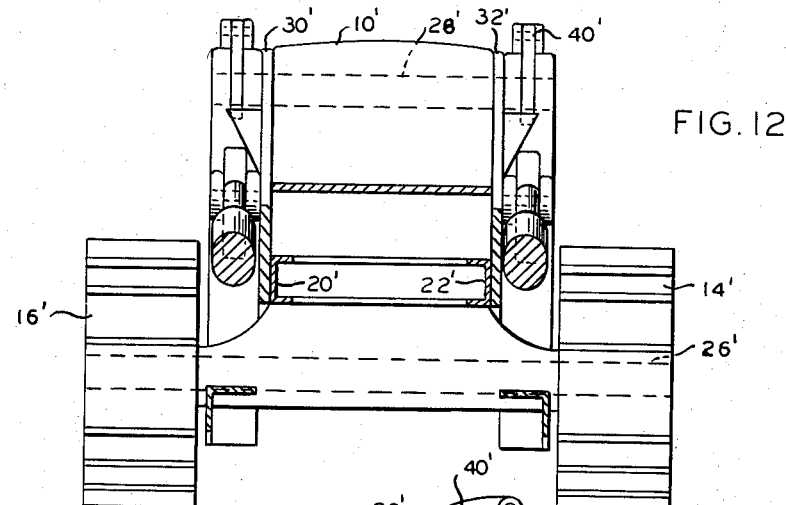
Figure 13:
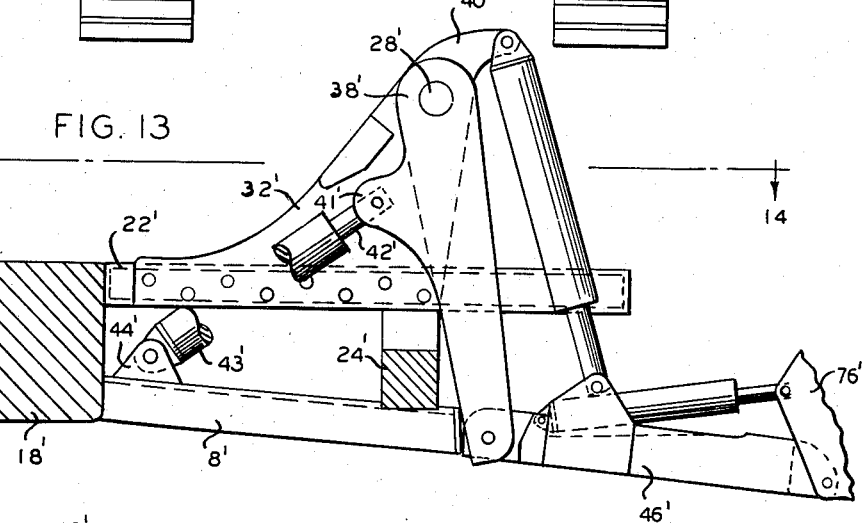
Figure 14:
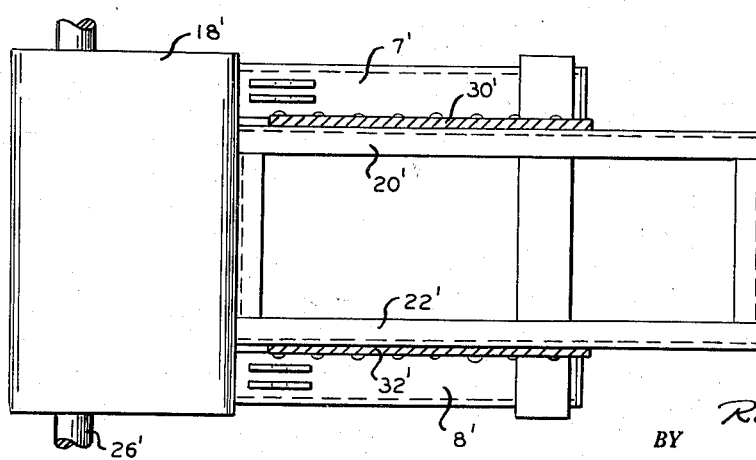
Figure 15:
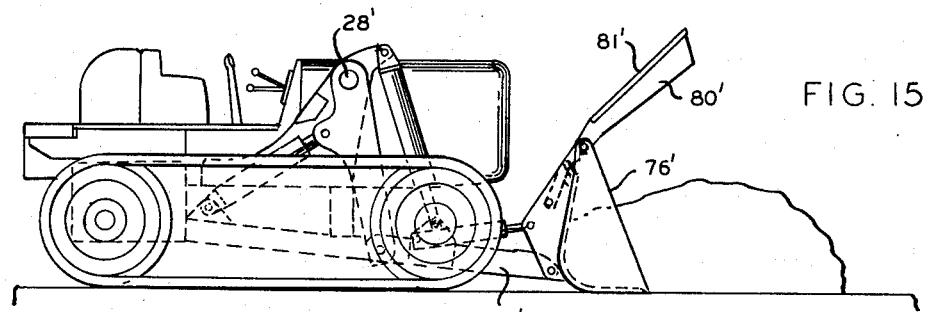
Figure 16:
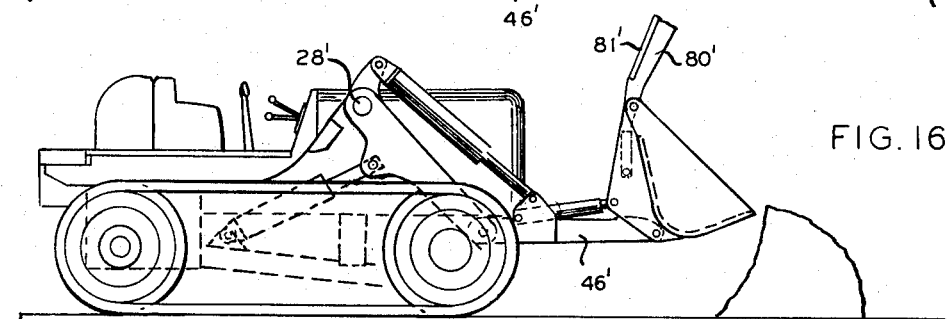
Figure 17:
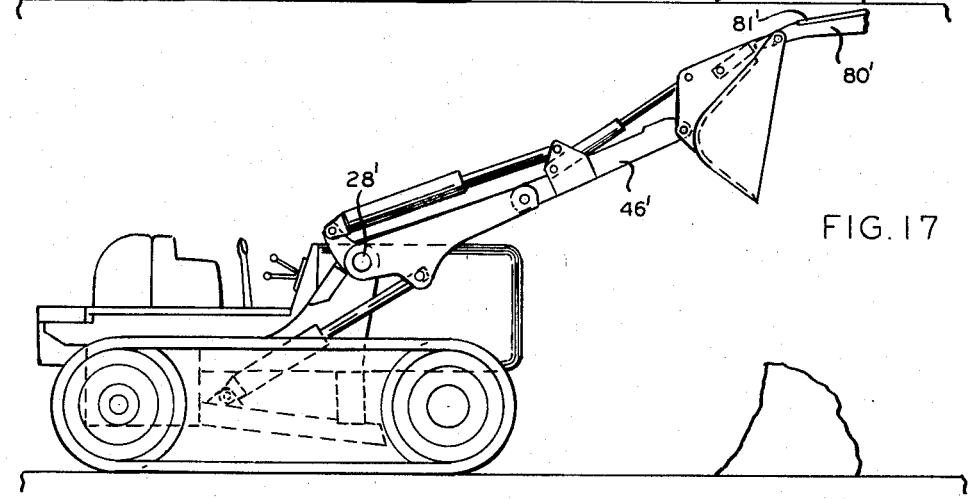

Figs. 10–18 inclusive illustrate another general form of blade and bucket assembly mounted on a tractor body inside of the traction members, and Fig. 10 shows in particular a side elevational view of a tractor having an internally located blade and bucket assembly supported therein;

Fig. 11 is a plan view of the structure shown in Fig. 10;

Fig. 12 is a rear elevation view of the structure shown in Fig. 10;

Fig. 13 is a cross-sectional view illustrating particularly a stop and push arm arrangement;

Fig. 14 is a detail plan section;

Fig. 15 is an elevational view showing the blade in a raised position;

Fig. 16 is another elevational view showing the blade raised and the bucket raised to an intermediate position;

Fig. 17 shows the bucket in a dumping position; and

Figure 18:
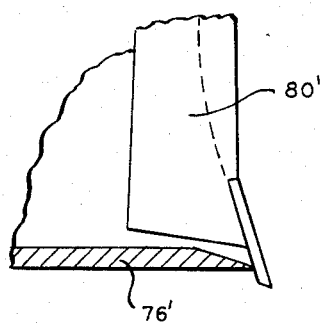

Fig. 18 is a detail cross section of the blade and bucket.

The materials handling structures illustrated in the drawings noted comprise preferred embodiments of the invention and are, in general, based upon the idea of combining a blade and a bucket so that these members can be used either as an hydraulically controlled bull dozer or a shovel.

The invention, in both of the forms indicated, operates on a new principle of absorbing working stresses which, so far as I am aware, has not heretofore been employed in the art. This principle involves a distribution of working stresses through the rear driving wheel axles. This is realized by means of a braced lever mechanism with which loading may be carried out and yet relatively heavy shock forces and other stresses, such as developed in bull dozing operations, may be transmitted through special stop means to substantially eliminate any bending forces in the lever mechanism and to avoid excessively loading the hydraulically controlled units.

In order to provide for a distribution of working stresses in a suitable manner while utilizing a blade and bucket arrangement externally of the traction elements, I have devised a special organization of parts with a tractor body wherein a main connecting shaft and relatively heavy mounting frame pieces are secured to the tractor body at points well above the axes of the rear driving wheels of the tractor. I am thereby enabled to suspend two separated lever assemblies on the ends of the connecting shaft and to solidly lock together the two lever assemblies. In addition, I am enabled to locate two rigidly held stop members of the frame section of the tractor body in a position such that the longitudinal axes of these stop members coincide with the longitudinal axes of respective push arms and pass through the rear wheel driving axle.

As outlined above, the form of the invention shown in Figs. 1–9 may be conveniently thought of as being made up of four principal parts, including the blade carrying shovel; two stop-supported lever assemblies for positioning the shovel; a mounting frame and connecting shaft for uniting and reinforcing the lever assemblies; and, finally, an hydraulically controlled mechanism for moving these parts into desired positions of adjustment.

Considering first in detail the mounting frame and connecting shaft, attention is directed to Figs. 1 to 5, inclusive, of the drawings, wherein numeral 10 denotes a tractor of the conventional type having a pair of rear driving wheels, as 12, which engage with and drive tracks 14 and 16. In Fig. 4 I have further illustrated a typical tractor body construction with which my invention may be employed, although not necessarily being limited thereto. In the structure shown, the tractor 10 is provided with a rear body portion 18 which includes a very heavy metal housing usually consisting of a metal casting, for example. In this housing are formed openings, as 20, 22 and 24, for receiving various types of machine attachments well known to the art. In this housing 18 is contained the driving mechanism for the tractor, which is not shown in the drawings as it forms no part of the present invention. However, in Fig. 4 there has been shown the driving shafts 26 and 28 which carry the wheels 12.

In accordance with the invention, I provide a pair of mounting frame pieces which can be conveniently secured to the housing 18 or other parts, for example by bolts, welding, or other fastening means. These mounting frame pieces are denoted by the numerals 30 and 32 and comprise U-shaped members, best shown in Fig. 2. Inner legs 30a and 32a of U-shaped members 30 and 32, respectively, are adapted to be solidly secured to respective opposite sides of the housing 18, as by means of bolts 34. Also, these inner legs 30a and 32a are provided with right-angularly bent frame extensions 30b and 32b which are adapted to lie against the rearmost face of the casting body 18 and to be solidly secured by bolts 36, as illustrated in Fig. 4.

When thus secured to the casting 18, the two U-shaped members are of a size such that the respective outer legs thereof—30c and 32c—overlie and extend beyond the respective tracks 16 and 14 in spaced relationship therewith. Each of these outer legs 30c and 32c have downwardly extended portions through which are located openings, as 38 (Fig. 2). The openings 38 of members 30c and 32c are adapted to receive therethrough respective shouldered stub shafts 40 and 42 which are threaded on to shafts 26 and 28, or otherwise attached thereto. Nuts 44 and 46, for example, may also be threaded on to outer ends of the respective stub shafts 40 and 42 to solidly secure the lower sections of these frame pieces upon the shafts 26 and 28.

Figure 5:
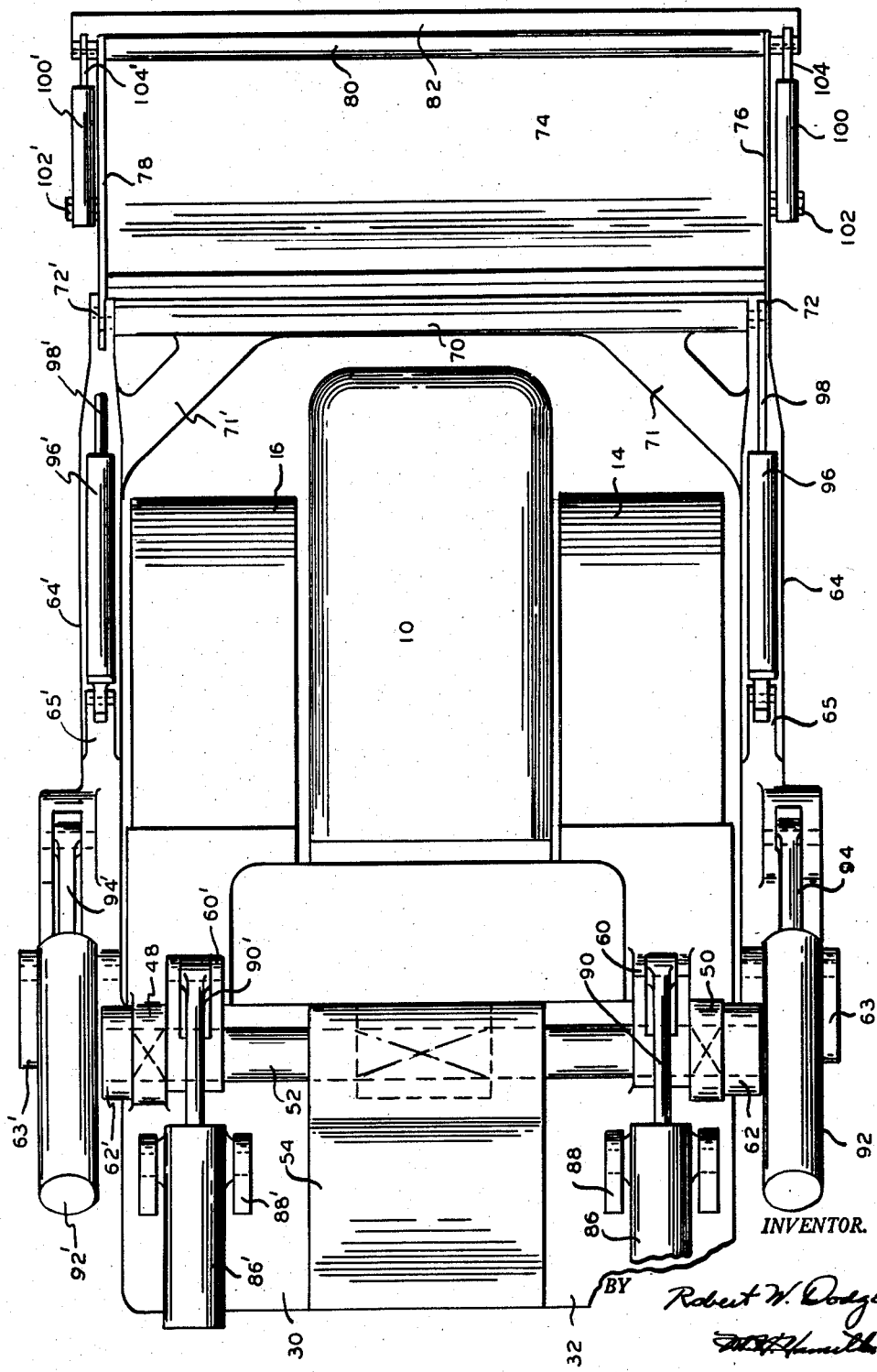
Fig. 5 is a plan view of a tractor body with the apparatus of the invention mounted thereon, and showing in further detail the dual pivoted lever mechanism for controlling the position of a blade carrying shovel unit.

It will be apparent that these supporting frame pieces are very rigidly secured to the tractor housing 18 and provide two supporting platforms which are located well above the tops of the tracks 16 and 14. On these supporting platforms are mounted large bearing members 48 and 50, and rotatably received through these bearing members is a main connecting shaft 52, as shown in Figs. 4 and 5. This shaft 52 extends transversely across the entire tractor body and has its outer ends projecting well beyond the frame pieces 30 and 32, as indicated in Fig. 4. At its intermediate portions the connecting shaft 52 may, for example, pass directly through the cab seat 54 which is normally occupied by the operator of the machine. If desired, fenders, such as are sometimes employed in tractor bodies, and indicated in the drawings by numerals 56 and 58, may be left in place so that they overlie, or are mounted above, the frame pieces 30 and 32, as suggested in Fig. 4, or the fenders may be completely removed.

Considering next the pivoted lever mechanism of the invention, I have provided two separated lever assemblies which are suspended from opposite ends of the connecting shaft 52 in the manner illustrated in Fig. 5. Included in these two lever assemblies are shaft controlling levers 60 and 60'; holding arms 62 and 62'; and pusher arms 64 and 64'. The shaft controlling levers 60 and 60' are fixed to the shaft 52 at two points intermediate the shaft extremities, as may be best seen in Fig. 5. Holding arms 62 and 62' are fixed to the ends of shaft 52 in an overhanging position such as that shown in Fig. 4, where it will be noted that depending portions of these arms are arranged to occur in spaced-apart relation to the respective frame pieces 30 and 32. Thus the lower extremities of these holding arms extend well outside of the tracks 16 and 14 at all points therealong. The lower ends of the arms 62 and 62' are also formed with bifurcated portions, as 61 (Fig. 4) between which portions is pivotally pinned the reduced ends of respective pusher arms 64 and 64'.

In accordance with the invention, I provide on the frame pieces 30 and 32 respective stop elements 29 and 29' which may, for example, consist of heavy angle pieces welded, bolted, or otherwise fastened to adjacent surfaces of the respective frame pieces. These stop members are located, as earlier noted, so that their longitudinal axes, when extended, pass through the rear driving wheel axles. The longitudinal axes of these stop members coincide substantially with the longitudinal axes of the two pusher arms 64 and 64' when these arms are in a bull dozing position with the arms 62 and 62' occurring in abutting relationship with respect to the stops. By means of this arrangement, it will readily be seen that forces transmitted through the pusher arms 64 will be received against the stop members and, in turn, transmitted to the rear axles of the driving wheels with very little opportunity for bending forces to develop in either the holding arms or the pusher arms. The operation of these stop members will be further discussed at a later point in the specification.

It is also pointed out that the holding arms 62 and 62' are formed with special bearing portions 63 and 63' preferably constructed as integral parts of these arms. Similarly, the pusher arms 64 and 64' are constructed with bearing portions 65 and 65'. The bearings 63 and 63' and 65 and 65' comprise pivotal supports for portions of the hydraulic control elements hereinafter described.

Transversely disposed through the forward extremities of the arms 64 and 64' is a connecting rod 70 which serves to solidly lock together these two arms and which also presents at opposite ends thereof bearing pins 72 and 72'. The connecting rod 70 is preferably braced by means of corner braces 71 and 71' to impart further rigidity to the entire lever mechanism.

Pivotally mounted on the pins 72 and 72' is a materials handling unit which comprises a blade carrying bucket or shovel body made up of an intermediate body portion 74 and two end walls 76 and 78 having a shape such as that suggested in Fig. 1.

It will be observed that this bucket member is open at its top and front sides. A bull dozer blade 80 is mounted in the bucket in the position shown in the drawings and such that the blade may be moved to close or cover the above noted openings at either the top or front sides of the bucket. The blade 80 is formed with a reinforced bottom cutting edge 82 and is also preferably constructed with a curved rear surface shaped to coincide with correspondingly curved forward edges of the walls 76 and 78 so that when the blade 80 is in a position such as that indicated in Fig. 1, for example, these forward edges of the sides 76 and 78 will bear against the blade and provide a strong reinforcing effect all the way around the blade edges to thereby permit the blade to function as a normal bull dozer blade would.

The hydraulic control mechanism for operating this lever mechanism and blade carrying bucket is also of a dual nature and includes a series of hydraulic cylinders pivotally supported at various points in the apparatus described. Thus, the control levers 60 and 60' are operated in response to a pair of hydraulic cylinders 86 and 86', which are pivotally supported in respective pairs of bearing members 88 and 88'. These hydraulic cylinders are operatively connected to the levers through respective connecting rods 90 and 90'. The bearings for pivotally supporting these cylinders 86 and 86' are preferably supported on the frame pieces 30 and 32, as best shown in Fig. 5.

A second pair of hydraulic cylinders noted by the numerals 92 and 92' are pivotally supported in respective bearings 63 and 63', already described as being a part of the holding arms 62 and 62'. These cylinders are operatively connected to the respective arms 64 and 64' by means of connecting rods 94 and 94'.

A third pair of hydraulic cylinders are comprised by cylinders 96 and 96' which are pivotally supported in the bearing portions 65 and 65', respectively, above noted. Connecting rods 98 and 98' operatively connect the cylinders 96 and 96' with rear portions of the bucket 76, as best shown in Fig. 1. A final set of hydraulic cylinders consisting of the cylinders 100 and 100' are pivotally mounted in bearings 102 and 102' on opposite outer surfaces of the walls 76 and 78. Connecting rods 104 and 104' connect the cylinders 100 and 100' to the blade 80 in the manner illustrated in Fig. 5. In Fig. 9 I have illustrated diagrammatically the several hydraulic cylinders, together with their connecting flow lines for hydraulic fluid. A pump P forces fluid from a sump S through a control valve V to a selector valve T in whatever sequence desired to operate the respective cylinders.

An outstanding feature of the apparatus now described is the unique organization of the stop controlled lever assemblies and mounting frame pieces whereby the two holding arms of the lever mechanism may be readily and positively located in cooperating relationship with their respective stop members and in a rigidly abutting manner to provide for operating the machine as a bull dozer. Such an abutting position of the holding arms with respect to the stop members 29 and 29' has been shown in Fig. 1 and therefore this figure may be considered as being representative of the machine occurring in a postion to function as a bull dozer.

As will be seen from an inspection of Fig. 1, the blade member 80 is in a lowered position and its heavy cutting edge 82 is adapted to comprise the normal reinforced edge found in most bull dozer blades. Since the blade is completely received upon the forward edges of the bucket member, a very rigid reinforcing effect is developed which enables the blade to be of relatively lighter weight than standard blades and to nevertheless constitute a blade mass of considerable magnitude and well adapted to performing a large number of common bull dozing operations.

It is pointed out that forces originating at the lower reinforcing edge of the blade 80 will be transmitted through the pusher arms 64, 64' and will become centered in the pivots of the respective holding arms 62, 62'. The stresses thus developing in the holding arms are, however, almost entirely taken up by the stop members 29 and these stresses are, in turn, distributed rearwardly against the portions of the frame pieces which are mounted on the axles of the rear driving wheels 12. Since a large part of the weight of the tractor body is concentrated on these wheel axles, these members are well adapted to take the thrust transmitted from the bucket and, in effect, do so substantially in the manner achieved in ordinary bull dozer vehicles. It is further pointed out that the axis of pivoting of the pusher arms 64, 64' in their respective holding arms 62, 62' lies in a plane which passes through the longitudinal axes of the pusher arms and rearwardly through the axes of rotation of the rear driving wheels. Therefore, there is little, if any, opportunity for bending forces to develop at any point in the lever assemblies. Still further it is pointed out that by suspending the lever assemblies from a connecting shaft which is located well above the wheel axles, all of the lever and operating cylinder components above the bottom pivots of the holding arms are almost entirely protected from stresses or shock forces of any type.

The apparatus of the invention, when so desired, may also be employed to carry out substantially all of the usual functions common to conventional loaders. In connection with this type of materials handling the blade 80, together with the supporting bucket, may be utilized in any one of a number of positions. Thus in a loading operation, such as that suggested in Fig. 6, for example, the two lever assemblies are adjusted through their respective hydraulic cylinders so that the bucket is brought into a position to scoop up material M from a pile with the blade 80 being swung back in a position in which it rests upon the upper edges of the bucket, as noted in Fig. 6. The lever mechanism is then actuated by hydraulic cylinders 86, 86' and cylinders 92, 92' to push the bucket ahead and simultaneously scoop up a desired quantity of material M. If desired, the lifting action of the hydraulic cylinders 92, 92' on the arms 64, 64' may be carried out either independently or simultaneously wth the scooping action.

In connection with that type of scooping operation in which the scoop is desired to be lifted, as well as advanced, an important feature of the invention may consist in the use of the heavy blade 80 as an aid to forcing material M into the bucket at some point in the loading operation. It is pointed out that by first raising the blade into an elevated position above the pile of material M shown in Fig. 6, for example, and then forcing the blade downwardly against material partly received in the bucket, a further transfer of material into the bucket may be realized, and also the material may be more solidly compacted and held in the bucket by crowding it between the blade and the bucket edges.

It should also be noted that the arrangement of a pivoted blade on the bucket in the manner disclosed makes it possible to pick up and firmly hold various other heavy bodies, such as beams and other structural pieces of cumbersome form and which normally require the services of a lifting crane or similar boom equipped machine.

Earth materials, or other bodies thus picked up in the bucket, may be raised to a desired height and then released into a dump truck or transferred to some desired point in front of the machine operator. In the case of the handling of structural pieces, however, a further advantage is realized in that the bucket may be rotated into a position in which the pusher arms 64, 64' lie either in a substantially upright position or in some desired inclined position. Thereafter, by means of the particular jointed relationship of the levers, the bucket may be moved either toward or away from the tractor while maintaining substantially the same position of uprightness or inclination, as the case may be.

It will readily be appreciated that this feature is of great advantage in carrying out an operation which involves not only raising a heavy structural piece but also adjusting it while in a raised position in order to obtain a correct location with respect to other pieces already installed.

Still another desirable position into which the bucket may be moved by reason of the particular lever assemblies and hydraulic cylinder mountings has been illustrated in Fig. 8, wherein it will be observed that the bucket member has been shown pivoted through a rearwardly directed arc until it is located in a point well in back of the tractor body in a position convenient for releasing scooped material into a vehicle, such as a dump truck, which is driven into close proximity with the rear of the tractor 10.

A novel feature of the cylinder and lever assembly structure of the form of invention shown in Figs. 1–9 inclusive, particularly making possible such a wide range of extensibility, is the arrangement of the cylinders 92, 92' in offset relation to the holding arms 62, 62' as provided by the specially formed bearing portions 63, 63' earlier described and which are located at points between the two extremities of these respective holding arm members. As will be noted from an inspection of Fig. 8, the cylinder 92, because of this particular mounting, is free to pivot in its bearing through a very wide arc such as is suggested by the broken line showing of this member in Fig. 8, and yet the entire lever assembly remains under the control of the shaft control levers 60, 60' and their respective hydraulic cylinders 86, 86'.

I may also provide for distributing working stresses rearwardly through a tractor body in other ways in order to avoid overloading the working parts of a bulldozer blade and bucket combination. For example, in Figs. 10–18, I have illustrated a unique combination of elongated load transmitting stop members and cooperating lever assemblies for operating a blade and bucket as a bulldozer. This organization of parts is further characterized by a pair of rigidly connected lever elements arranged to operate inside the traction elements of a tractor instead of outside, as was the case with the machine of Figs. 1–9, inclusive.

Referring in detail to Fig. 10, 10' denotes a tractor body provided with forward wheels 11' and rear wheels 12'. Mounted around these wheels are respective traction members as 14', 16'. Numeral 18' denotes a heavy rear frame section of the tractor body through which may be mounted, for example, a rear axle 26', as well as other conventional driving gear mechanisms.

A feature of this particular embodiment of the invention is the provision with the rear frame section 18' of a pair of special elongated load transmitting stops which are indicated by numerals 7' and 8'. These elongated stops 7' and 8' occur in spaced-apart relation and are solidly secured as by welding to the frame section 18' in a forwardly inclined position chosen such that the longitudinal axes of these two elongated stops, when extended, will pass through the axis of the axle 26'. The two elongated stops are solidly welded at their forward ends to a transverse framepiece 24', most clearly shown in Fig. 13.

The transverse framepiece 24' may be secured in some convenient manner to the truck body as, for example, by being secured to the underside of a pair of horizontally disposed channelled members 20' and 22' (Figs. 13 and 14). These channelled members 20' and 22' are adapted to be welded or otherwise secured at their rear extremities to the heavy frame section 18', as illustrated in Figs. 13 and 14. The forward ends of the channelled members 20' and 22' extend along opposite sides of the tractor body and are adapted to be secured to adjacent portions of the tractor body at convenient points immediately above the front wheels 11'.

In combinataion with the elongated stop members and the supporting frame construction described, I further provide a pair of rigidly connected lever assemblies L and L' mounted for rotation at either side of the tractor body and arranged to swing inside of the traction elements. As one suitable means of thus mounting the lever assemblies L and L', I have provided a pair of lever support plates 30' and 32' which may, for example, be secured by bolts, welding or other suitable means to opposite outer surfaces of the channelled members 20' and 22', as illustrated in Figs. 13 and 14. These lever support plates extend rearwardly to points nearly adjacent to the main frame section 18' and each of the plates 30' and 32' also project upwardly at either side of the tractor body, as suggested in Fig. 10.

Pivotally supported through the tops of these lever support plates 30' and 32' in suitable bearings is a shaft 28' at opposite ends of which are fixed two lever assemblies for operating a bucket as 76' having a blade 80' attached thereto. The shaft 28' comprises a heavy steel member for rigidly locking the two lever assemblies together in the same manner as provided for by shaft 52 in the structure illustrated in Figs. 1–9 of the drawings. Preferably, this shaft may extend through the tractor body just above the engine block or at some other convenient point.

The lever assemblies L and L' are most clearly shown in Fig. 11. Each of these lever assemblies are of the same construction and, in the case of the lever assembly L, for example, there is included a pair of spaced-apart levers as 36', 38' fast on shaft 28' between which is rigidly secured an arm 40'. The lever portions 36' and 38' are further formed with spaced-apart extension portions as 41' more clearly shown in Figs. 10 and 13 and pivotally secured between these extension portions 41' is an actuating rod 42' of an hydraulic cylinder 43'. The lower end of cylinder 43' is pivotally mounted in a pair of brackets as 44', illustrated in Figs. 10 and 13. At the lower ends of the spaced-apart levers 36' and 38' is pivotally attached a push arm 46' which normally extends forwardly and downwardly in approximately the position suggested in Figs. 10 and 13 in one position of adjustment.

The lever assembly at the left-hand side of Fig. 11, generally denoted by the arrow L', includes similar parts consisting of a push arm 59' connected to the push arm 46' by a cross piece 58'. Also included in lever assembly L' is an hydraulic cylinder 60'', actuating rod 61'', levers 62'', 63'', and arm 64'', hydraulic cylinder 65'', rod 66'', holding brackets 67'', 68'', hydraulic cylinder 69'', actuating rod 70'' and supporting brackets 71'' and 72''.

At the outer end of the push arm 46' is the bucket 76' pivotally pinned at 47', as shown in Fig. 10. The bucket member 76' is constructed along its back portion with vertical retaining plates 48' and 49' between which is pivotally pinned an actuating rod 50' of an hydraulic cylinder 51' and the opposite end of this hydraulic cylinder 51' is secured in holding brackets 52' and 53'. Also secured in the holding brackets 52' and 53' is an actuating rod 54' pivotally supported at 55' and forming a part of an hydraulic cylinder 56' whose upper end is pivotally attached to the arm 40' earlier referred to.

The bucket 76' also has supported between the two pairs of holding brackets 71'', 72'' and 48', 49' respective blade controlling hydraulic cylinder 73'' and 74'' which include operating rods 75'', 76'' attached between pairs of lug portions 78'', 79'', as shown in Fig. 11.

It will be seen from an inspection of Fig. 12, the entire organization of each of these lever assemblies is very compactly contained within the narrow spaces lying between the tractor body 10' and the two traction elements 14' and 16'. This has a highly desirable handling advantage for some types of earth moving operations since it avoids interference and affords the operator a view of the levers at all times.

It is further pointed out that the two lever assemblies are located in positions so chosen with respect to the elongated stop members that, when the lever portions 36', 38' and also lever portions 62", 63" are in a most nearly vertical position in abutting relationship with respect to the forward ends of respective elongated stops 8' and 7', the longitudinal axes of the two push arms 46' and 59' substantially coincide with the respective longitudinal axes of the elongated stops. As also earlier pointed out, the longitudinal axes of the elongated stops, when extended, pass through the axle 26'. Thus, when the bucket 76' and the blade 80' are in a bulldozing position such as that illustrated in Fig. 10, for example, reaction working stresses resulting from pushing the bucket and blade forwardly against a mass of earth or other material will be transmitted along straight lines passing through the axes of the push arms 46', 59' and the elongated stop members 8' and 7' to become localized along the main driving axle 26' of the tractor. This occurs without any of the operating lever linkages or their component pivots being subjected to bending forces or unbalanced stress loads and the entire distribution of stress forces is maintained low relative to the body of the tractor and at points where these forces are most readily absorbed by the heavy frame construction of the tractor.

The operation of the bucket and blade components by means of this stop and lever assembly construction described has been generally illustrated in Figs. 10, 15, 16 and 17. It is intended that there may be employed an hydraulic control circuit corresponding to the hydraulic circuit already described in connection with the apparatus shown in Figs. 1–9. Thus, operating the hydraulic cylinders 43' and 60" will rotate the lever assemblies in a counterclockwise direction, as viewed in Fig. 10, and the bucket is caused to move from its braced bulldozing position illustrated in Fig. 10 to a position in which the bucket is raised above the ground, as suggested in Fig. 16.

Forward movement of the push arms 46' and 59' is selectively controlled through the hydraulic cylinders 56' and 65". Similarly, the bucket 76' may be tipped from a position such as that shown in Fig. 10 to various other positions such as those shown in Figs. 16 and 17 by selectively operating the hydraulic cylinders 51' and 69". Finally, the position of the blade member 80' may, in any of these positions described, be changed by operating hydraulic cylinders 73" and 74", as suggested in broken lines in Fig. 10 and also shown in varying positions of adjustment in Figs. 15, 16 and 17. For such controlled operations I may employ an hydraulic circuit corresponding substantially to the hydraulic circuit shown in Fig. 9. Various other arrangements may also be employed for this purpose.

A further desirable feature resides in the construction and arrangement of the bucket and blade components to furnish novel handling characteristics. For example, the bucket 76' is preferably constructed with edges which are spaced apart a distance such that the blade member 80' may rest thereagainst in a closed position of this blade member. In addition, the blade member is constructed of a heavy reinforcing cross-section which includes flanged portions 81' adapted to overlie adjacent edges of the bucket and to be supported thereagainst. This affords a very durable bulldozing blade arrangement which is capable of withstanding heavy working stresses and which is, nevertheless, constructed of relatively lighter materials than are normally employed in a standard type of bulldozer blade.

A further feature is the pivotal mounting of the bulldozer blade in the holding brackets 48', 49' and 71", 72". These holding brackets are adapted to project for a substantial distance above the upper edge 90" of the bucket and the blade itself is formed with extensions which are received through slots defined by the upper ends of these holding brackets in pinned or pivoted relationship. As a result, when the blade is in a fully raised position, such as is suggested in broken lines in Fig. 10, viewing space is provided whereby a seated operator, as indicated in Fig. 10, is afforded a line of sight which reveals the area of material directly in front of the bucket edge. This is found to be a very important feature as it enables the operator to place the bucket and blade assembly in a more effective working position prior to starting either a digging or bulldozing operation. Furthermore, where the blade comes into contact with an obstruction in the ground or other immovable body, the operator can raise the blade and set the shovel assembly in a correct position to avoid such interference.

From the foregoing description it will be evident that I have disclosed combined bull dozer-loader types of tractor units which are capable of performing substantially all of the operations of a conventional bull dozer without being undesirably affected by shock forces and other stresses normally developing in the course of bull dozing or loading operations. At the same time all of the ordinary type of loading operations can quickly and conveniently be carried out and, in fact, the range of operation of normal loader vehicles has been substantially extended and desirable flexibility and adjustability features made available. The invention has preferably been embodied in a combined mounting frame and lever structures which are particularly suited for attachment to standard types of tractor bodies without requiring change or alteration of these members in any material respect. This organization of parts is further distinguished by the fact that there is at all times in the operation of the mechanisms, regardless of what position they may be moved into, a much wider range of visibility on the part of an operator who is seated in the cab portion of the tractor body. This enables him to perform loading and bull dozing operations more quickly and more efficiently. The combination of the hinged blade permits a wide range of closure operations to be carried out in any one of a number of positions of adjustment.

It may be desired to mount other types of buckets or shovels, as well as other accessories, such as booms of special construction, on the pusher arm assembly. Likewise, it may be desired to use the bull dozer blade independently of a bucket, and a special bull dozer blade support or bracket may be provided for supporting the pusher arm 64.

While I have shown a preferred embodiment of the invention, it is understood that various changes and modifications may be resorted to in keeping with the scope of the appended claims.

This application is a continuation-in-part of my copending application Serial No. 365,725 filed July 2, 1953, now Patent No. 2,883,772.

Having thus described my invention, what I desire to claim as new is:

1. A materials handling machine comprising a tractor having a body portion, forward and rearward pairs of driving wheels and traction members engaged around said driving wheels, bearing means located at opposite upper sides of the said tractor body portion, a shaft transversely disposed across the tractor and mounted for rotation in said bearings, a pair of depending supporting arms fixed to opposite ends of said shaft, said depending supporting arms extending downwardly at either side of the tractor body portion to a level occurring between upper and lower sections of the respective traction units and in close proximity to a plane passing through the axes of rotation of the said forward and rearward driving wheels, actuating means for moving said shaft and depending supporting arms through a limited arcuate path of travel, stop means supported on the tractor body portion at points lying between upper and lower sections of the respective traction units thereby to limit the arcuate path of travel of the depending supporting arms when in a substantially vertically disposed position, a bulldozer shovel unit, a pair of push lever elements pivotally attached to respective lower ends of the said depending supporting arms and extending forwardly along opposite sides of the tractor body, said push lever elements having the shovel unit adjustably supported between their forward extremities whereby, when the push lever elements and shovel are in a bulldozing position, working stresses may be transmitted from the shovel unit rearwardly through the push lever elements and absorbed by said stop elements, a pair of hydraulic control elements arranged to pivot in unison with the depending supporting arms, said hydraulic control elements being connected to the push lever elements and operative to swing the push lever elements and shovel unit through a range of working positions in any given position of adjustment of the depending supporting arms.

2. A structure as defined in claim 1 in which the said depending supporting arms and the said push lever elements, pivotally attached to respective lower ends of the said depending arms, are located inside respective traction members.

3. A structure as defined in claim 1, including a transverse beam element located at the underside of the tractor body and having its opposite ends solidly secured to the said stop elements to provide for solidly locking the stop members together.

4. A machine of the class described comprising a tractor body including a pair of front wheels and a pair of rear driving wheels arranged at opposite sides thereof, traction members engaged about respective front and rear wheels in spaced relation to the tractor body, a materials handling unit consisting of a bucket and a blade supported thereon and swingable into a bulldozing position in which the blade is received against edge portions of the bucket and reinforced thereby, lever retaining blades rigidly secured to opposite sides of the tractor body, a shaft member rotatably mounted in the lever retaining blades in a transversely disposed position in front of the operator's seat in the tractor body, lever mechanisms fixed to opposite ends of the shaft member for adjustably locating the materials handling unit in desired work positions, said lever mechanisms including a pair of depending support arms and pushing levers pivotally attached to the ends thereof, hydraulic means for causing the lever mechanisms to advance and retract within those spaces occurring between the tractor body and said respective traction members in a protectively housed manner.

5. A structure as defined in claim 4 including a pair of elongated stop members solidly secured to the tractor body and disposed in a forwardly inclined position to provide abutments for the said lever mechanisms when the push levers are in a lowered digging position and the bucket and plate are engaged for a bulldozing operation.

6. A structure according to claim 4 in which the bucket is formed at its top edge with upwardly projecting lug portions and said blade includes cooperating lug extensions adapted to be pivotally received in the upwardly projecting lug portions whereby the blade may be swung into a raised position to define a viewing space between the blade and bucket through which an operator in the tractor may inspect a work area directly in front of the lowered bucket.

7. A structure according to claim 4, including a pair of reinforcing frame pieces solidly secured at opposite sides of the tractor body, a pair of elongated stop members fixed to the tractor body at the undersides of said frame pieces, a transverse beam having its ends rigidly secured to the stop members to lock these stop members together.

References Cited in the file of this patent

UNITED STATES PATENTS

| | | |
|---|---|---|
| 2,249,356 | Goodman | July 15, 1941 |
| 2,417,544 | Coleman | Mar. 18, 1947 |
| 2,418,251 | Drott | Apr. 1, 1947 |
| 2,455,474 | Drott et al. | Dec. 7, 1948 |
| 2,517,582 | Lull | Aug. 8, 1950 |
| 2,519,974 | Mork | Aug. 22, 1950 |
| 2,530,414 | Wells | Nov. 21, 1950 |
| 2,560,674 | Westall | July 17, 1951 |
| 2,644,251 | Smith | July 7, 1953 |

FOREIGN PATENTS

| | | |
|---|---|---|
| 950,541 | France | Mar. 21, 1949 |
| 662,087 | Great Britain | Nov. 28, 1951 |
| 1,025,035 | France | Jan. 21, 1953 |
| 27,420 | Finland | May 31, 1955 |
| 753,967 | Great Britain | Aug. 1, 1956 |